United States Patent
Okuda

(10) Patent No.: US 6,621,902 B1
(45) Date of Patent: Sep. 16, 2003

(54) KEY INPUT DEVICE

(75) Inventor: Tatsumi Okuda, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 403 days.

(21) Appl. No.: 09/708,666

(22) Filed: Nov. 9, 2000

(30) Foreign Application Priority Data

Nov. 15, 1999 (JP) ............................................. 11-323524

(51) Int. Cl.$^7$ ................................................ H04M 1/00
(52) U.S. Cl. ................................. 379/368; 379/433.07
(58) Field of Search ............................ 379/368, 433.07; 455/90; 200/5 A, 5 R, 5 D, 5 E, 159 B; 463/37

(56) References Cited

U.S. PATENT DOCUMENTS

| | | | | |
|---|---|---|---|---|
| 4,194,105 A | * | 3/1980 | Hodges | .................. 200/159 B |
| 4,687,200 A | * | 8/1987 | Shirai | ......................... 200/5 A |
| 6,409,600 B1 | * | 6/2002 | Sobota et al. | .................. 463/37 |

* cited by examiner

*Primary Examiner*—Jack Chiang
(74) *Attorney, Agent, or Firm*—Armstrong, Westerman & Hattori, LLP

(57) ABSTRACT

A key input device including a dome sheet provided over a base plate and having a plurality of dome portions, and a plurality of manual keys disposed above the dome sheet. Each of the dome portions is elastically restorably inverted by being depressed by the corresponding manual key to close contacts. The plurality of the manual keys described include a seesaw key with a pivotal pin, and the dome sheet has a flat sheet portion formed around the dome portions and includes an inner region extending inwardly of dome portions to be selectively depressed by a seesaw key, and an outer region extending outwardly of the dome portion. A spacer sheet is interposed between the base plate and the dome sheet to thereby position the inner region of the flat sheet portion of the dome sheet at a lower level than the outer region. The seesaw key pivotally moves about the contact portion of the pivotal pin and the inner region, whereby one of the dome portions is depressed.

2 Claims, 9 Drawing Sheets

KEY INPUT DEVICE

BACKGROUND OF THE INVENTION

1. Field of the Invention

The present invention relates to key input devices for use in portable telephones and the like, and more particularly to a key input device comprising a plurality of pairs of manual keys including a seesaw key adapted to selectively close one of the pairs of key contacts.

2. Description of the Related Art

With reference to FIG. 8, portable telephones usually have a casing formed by a front case and a rear case. A display and a plurality of manual keys are arranged on the surface of the front case. These manual keys include a seesaw key for use in selecting one of a plurality of functions. The illustrated seesaw key is adapted to selectively close one of four pairs of key contacts for the selection of the corresponding function.

The casing has a circuit board disposed in its interior as shown in FIG. 9. Arranged on the circuit board are a key sheet assembly to be depressed by the manual keys, the display, a high-frequency circuit module, a vibrator comprising a motor and an eccentric weight attached to the output shaft of the motor for notifying the user of incoming calls, etc.

With reference to FIG. 10, the key sheet assembly has a dome sheet of PET disposed over a base plate, with a spacer sheet interposed therebetween, and having a plurality of upwardly bulging dome portions. The manual keys including the seesaw key are arranged above the dome sheet for depressing the respective dome portions. The spacer sheet is formed with a plurality of circular holes corresponding to the respective dome portions and slotlike air vents interconnecting these circular holes, as shown in FIG. 11.

With the key sheet assembly, the dome portion is elastically restorably inverted by being depressed by the corresponding manual key to bring a contact terminal provided on the inner surface of the dome portion into contact with a contact electrode provided on the surface of the base plate to close a pair of contacts.

To reliably close the key contacts of the key sheet assembly, the contact terminal on the inner surface of the dome portion of the dome sheet must be brought into contact with the contact electrode on the surface of the base plate over as large an area as possible. It is therefore necessary to depress the dome portion vertically downward.

However, in the case of the dome portions to be depressed by the seesaw key, a pusher projecting downward from an end portion of the seesaw key depresses the corresponding dome portion in an oblique direction when the seesaw key is moved. Stated more specifically with reference to FIG. 10, the pusher of the seesaw key exerts a depressing force F at an angle of θ with a center axis V extending through the dome portion perpendicular thereto, consequently deforming the dome portion to a distorted form and bringing the contact terminal on the inner surface of the dome portion into point contact with the contact electrode on the base plate, hence the problem of failing to close the key contacts reliably.

SUMMARY OF THE INVENTION

Accordingly, an object of the present invention is to provide a key input device which is adapted to close key contacts reliably even with a seesaw key.

The present invention provides a key input device which includes a dome sheet disposed over a base plate and having a plurality of upwardly bulging dome portions, and a plurality of manual keys arranged above the dome sheet for depressing the respective dome portions, the manual keys including a seesaw key adapted to selectively depress one of dome portions included among the dome portions, each of the dome portions being elastically restorably invertable by being depressed by the corresponding manual key to bring a contact terminal formed on an inner surface of the dome portion into contact with a contact electrode formed on a surface of the base plate to close contacts.

The dome sheet has a flat sheet portion formed around the dome portions and comprising an inner region extending inwardly of the dome portions to be selectively depressed by the seesaw key, and an outer region extending outwardly of the dome portion. The seesaw key is formed with a pivotal pin projecting toward the inner region of the dome sheet. A spacer sheet is interposed between the base plate and the dome sheet and is formed with a plurality of holes corresponding to the respective dome portions. The interposed spacer sheet provides a difference in level from the surface of the base plate so that the inner region is positioned at a lower level than the outer region on the flat sheet portion of the dome sheet. The seesaw key pivotally moves about the contact portion of the pivotal pin and the inner region of the dome sheet to depress any one of dome portions.

Because the inner region of the flat sheet portion of the dome sheet is at a lower level than the outer region thereof in the key input device of the present invention, each of the dome portions to be selectively depressed by the seesaw key is included so as to be positioned at a lower level toward the inner region and at a higher level toward the outer region. Thus, each dome portion has its center axis included with respect to a perpendicular to the surface of the base plate. It is not always necessary to provide the difference in level as described above between the inner region and the outer region on the flat sheet portion of the dome sheet, but the difference should be provided when the seesaw key is operated to depress any one of the dome portions.

When one of these dome portions is pushed by depressing the seesaw key, the seesaw key pivotally moves about the contact portion of the pivotal pin and the inner region, and the center axis C extending through the dome portion perpendicular thereto is accordingly positioned in the same or approximately the same direction as the direction in which the depressing force F of the seesaw key acts. As a result, the dome portion is deformed symmetrically about the center axis, bringing the contact terminal on the inner surface of the dome portion into contact with the corresponding contact electrode on the base plate over a sufficient area. Because the dome portion deforms symmetrically about the center axis, this portion enables the user to feel the same sharp click as when with the other manual keys are depressed.

According to a specific embodiment of the present invention, the spacer sheet has an opening formed inwardly of holes corresponding to the respective dome portions to be selectively depressed by the seesaw key and including the holes, and the dome sheet has its flat sheet portion joined at the inner region to the surface of the base plate through the opening. In this embodiment, a level difference in match with the thickness of the spacer sheet is provided between the inner region of the flat sheet portion of the dome sheet and the outer region thereof.

With the key input device of the present invention, the seesaw key, like the other keys, brings the contact terminal on the inner surface of the dome portion into contact with the corresponding contact electrode on the base plate over a sufficient area as described above, whereby the key contacts can be closed reliably.

DETAILED DESCRIPTION OF THE PREFERRED EMBODIMENT

Figure 8:
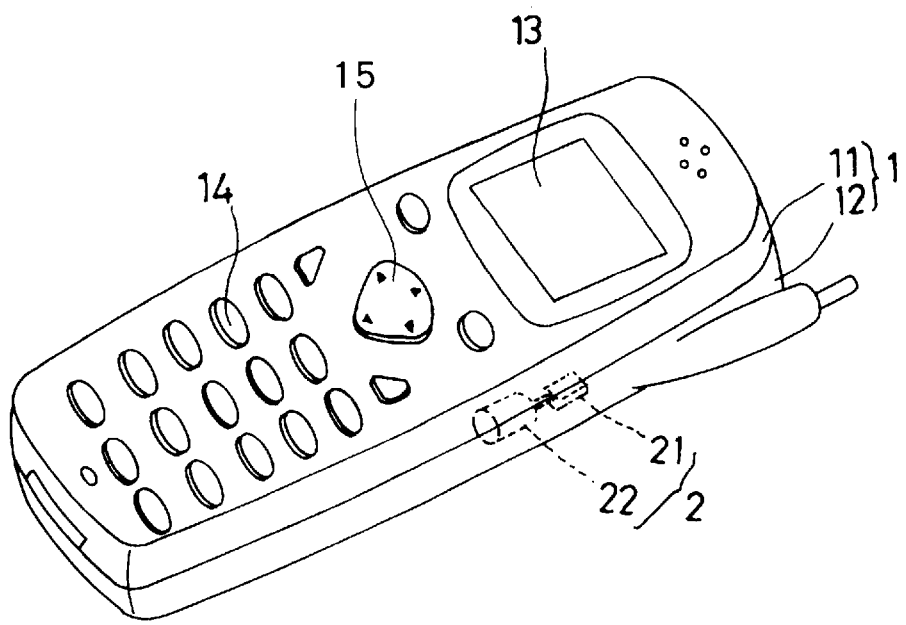
FIG. 8 is a perspective view showing the appearance of a portable telephone.
Figure 9:
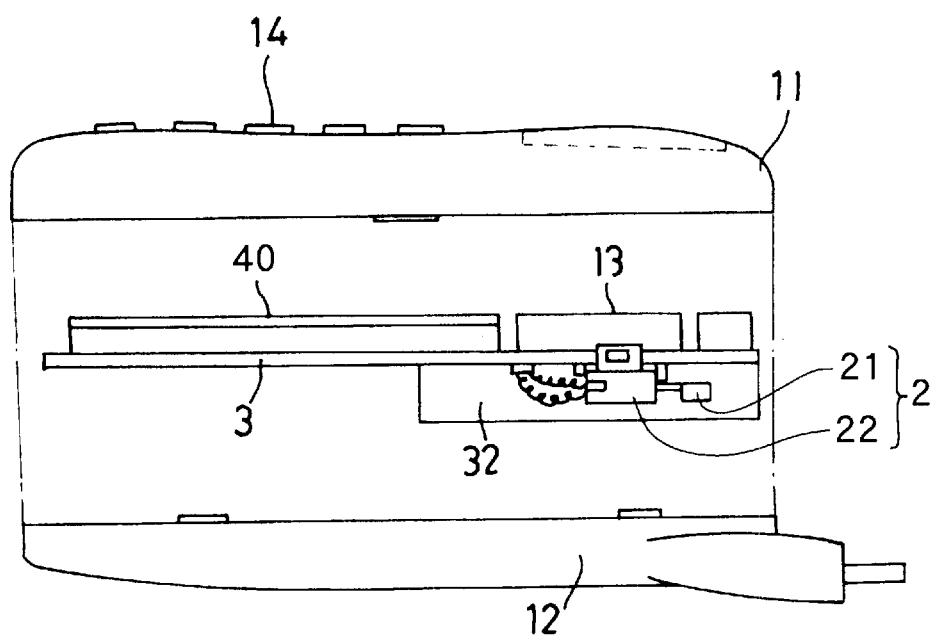
FIG. 9 is an exploded side elevation of the portable telephone.
Figure 10:
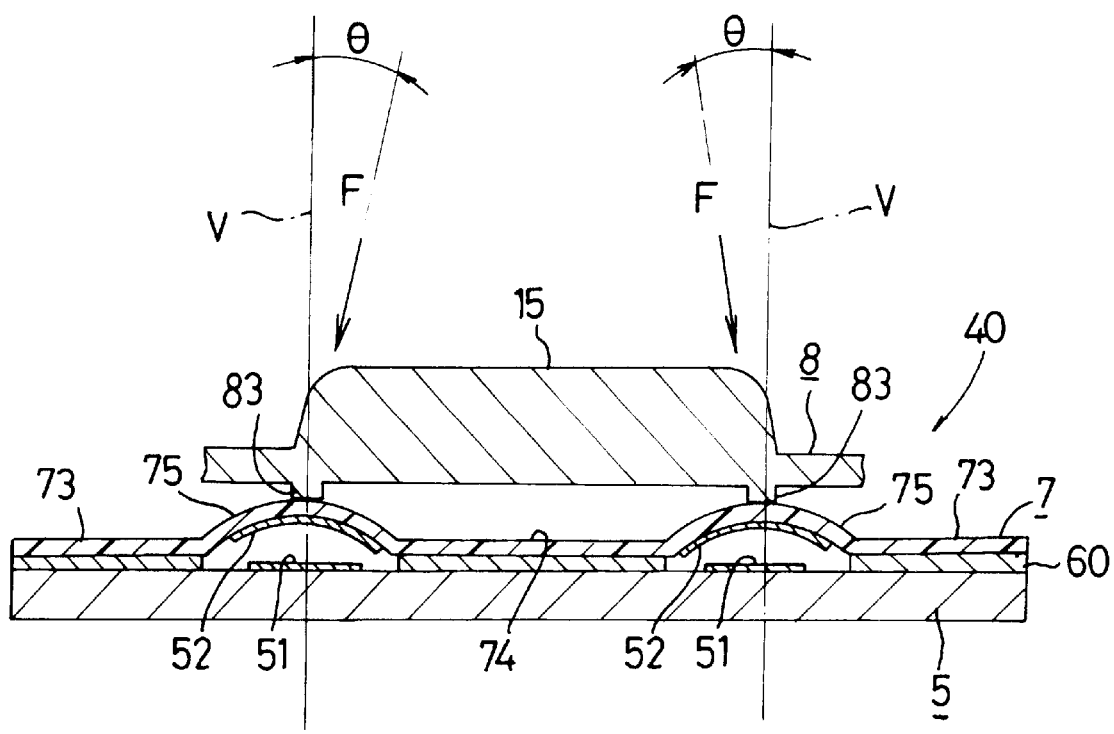
FIG. 10 is an enlarged view in section of a conventional key input device at the position of a seesaw key.

A detailed description will be given below of a preferred embodiment of the present invention for the portable telephone shown in FIGS. 8 and 9.

Figure 3:
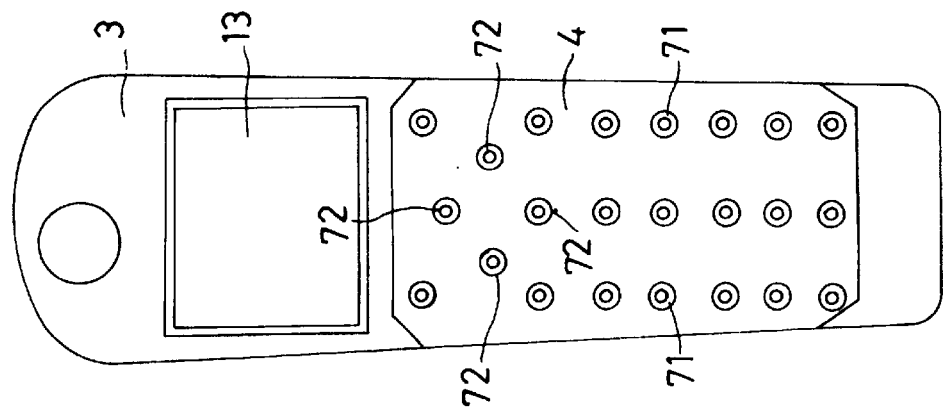
FIGS. 3(a), 3(b) and 3(c) are plan views showing a front case, a key sheet and a circuit board, respectively, of a portable telephone embodying the present invention.
Figure 3:
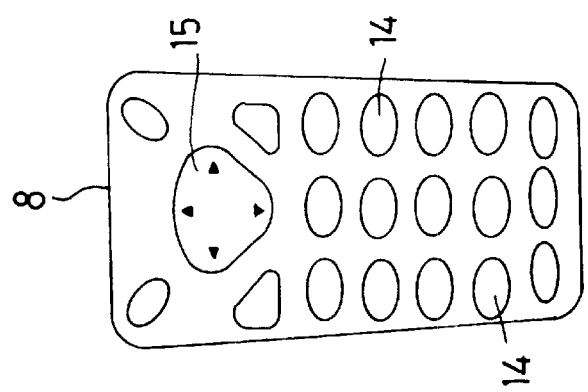
Figure 3:
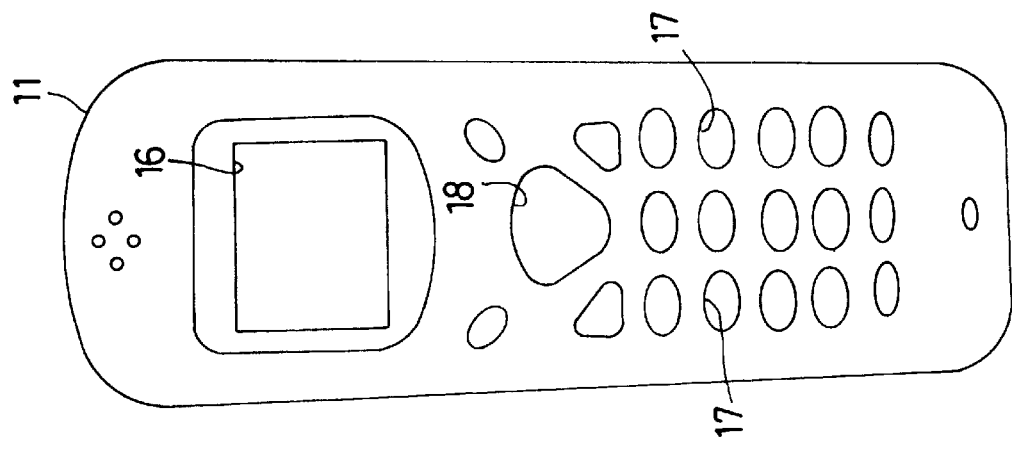

With the portable telephone of the present invention, the front case 11 constituting its casing is formed with an opening 16 for exposing the display 13, and a plurality of openings 17 for causing the manual keys 14 to project therethrough as shown in FIG. 3(a). These openings 17 include an opening 18 for positioning the seesaw key 15, as will be described below therein as projected therefrom.

Figure 1:
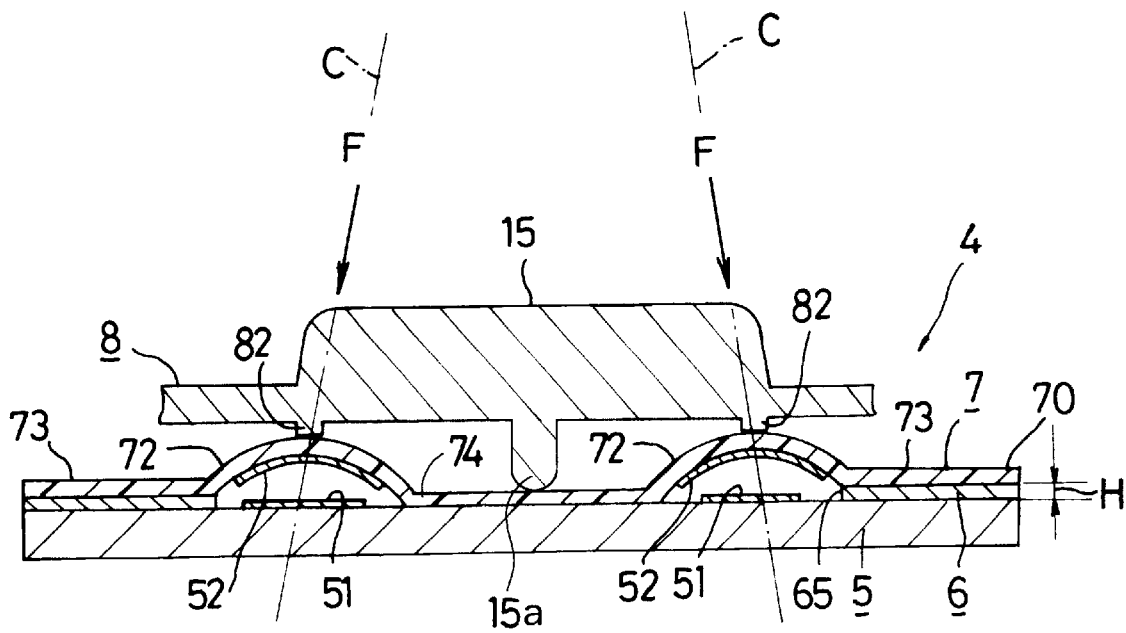
FIG. 1 is an enlarged view in section showing a key input device of the invention at the position of a seesaw key.

Disposed inside the front case 11 is, as shown in FIG. 3(b), a key sheet 8 of silicone rubber having the manual keys 14 formed integrally therewith. The manual keys 14 of the key sheet 8 include the seesaw key 15, which is adapted to selectively close one of four pairs of key contacts which are adjacent to one another. The seesaw key 15, as shown in FIG. 1, has a pivotal pin 15a projecting downward therefrom on the central portion of its rear side, and is pivotally movable about the end portion of the pivotal pin 15a.

With reference to FIG. 3(c), the circuit board 3 to be disposed within the casing is provided thereon with the display 13 and a key sheet assembly 4 having a plurality of dome portions 71. The dome portions 71 of the key sheet assembly 4 includes four dome portions 72, one of which is to be selectively depressed by the seesaw key 15.

Figure 4:
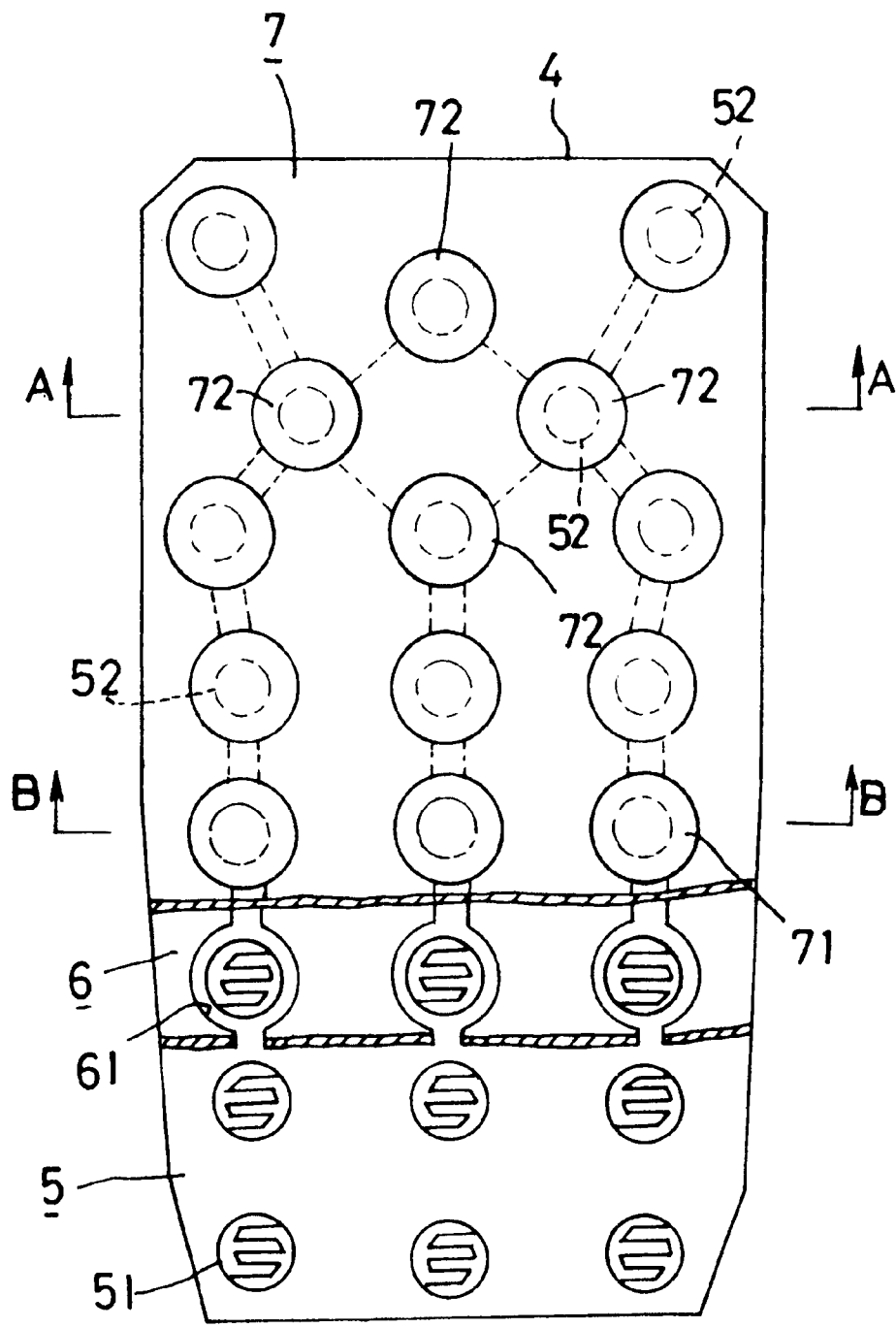
FIG. 4 is a plan view partly broken away of a key sheet assembly.
Figure 5:
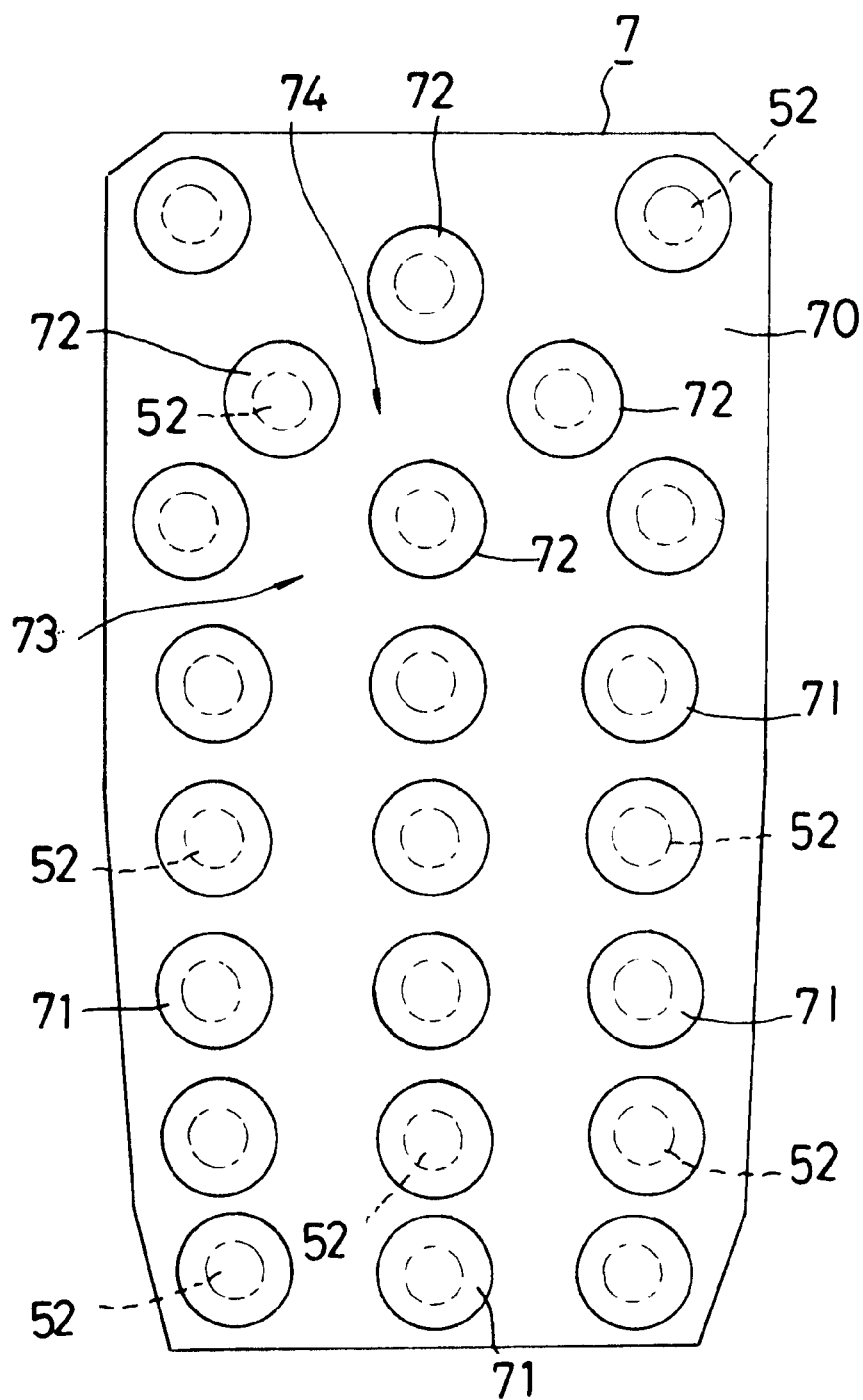
FIG. 5 is a plan view of a dome sheet.

As shown in FIG. 4, the key sheet assembly 4 comprises a spacer sheet 6 of PET provided over and joined to a base plate 5, and a dome sheet 7 of PET positioned over and joined to the spacer sheet 6. The dome sheet 7 comprises the dome portions 71 and a flat sheet portion 70 surrounding the dome portions 71 and integral therewith, as shown in FIG. 5. A contact terminal 52 in the form of a circular carbon film is provided on the inner surface of each dome portion 71. The flat sheet portion 70 of the dome sheet 7 has an inner region 74 extending inwardly of the four dome portions 72 to be selectively depressed by the seesaw key 15, and an outer region 73 extending outwardly of the four dome portions 72.

Figure 6:
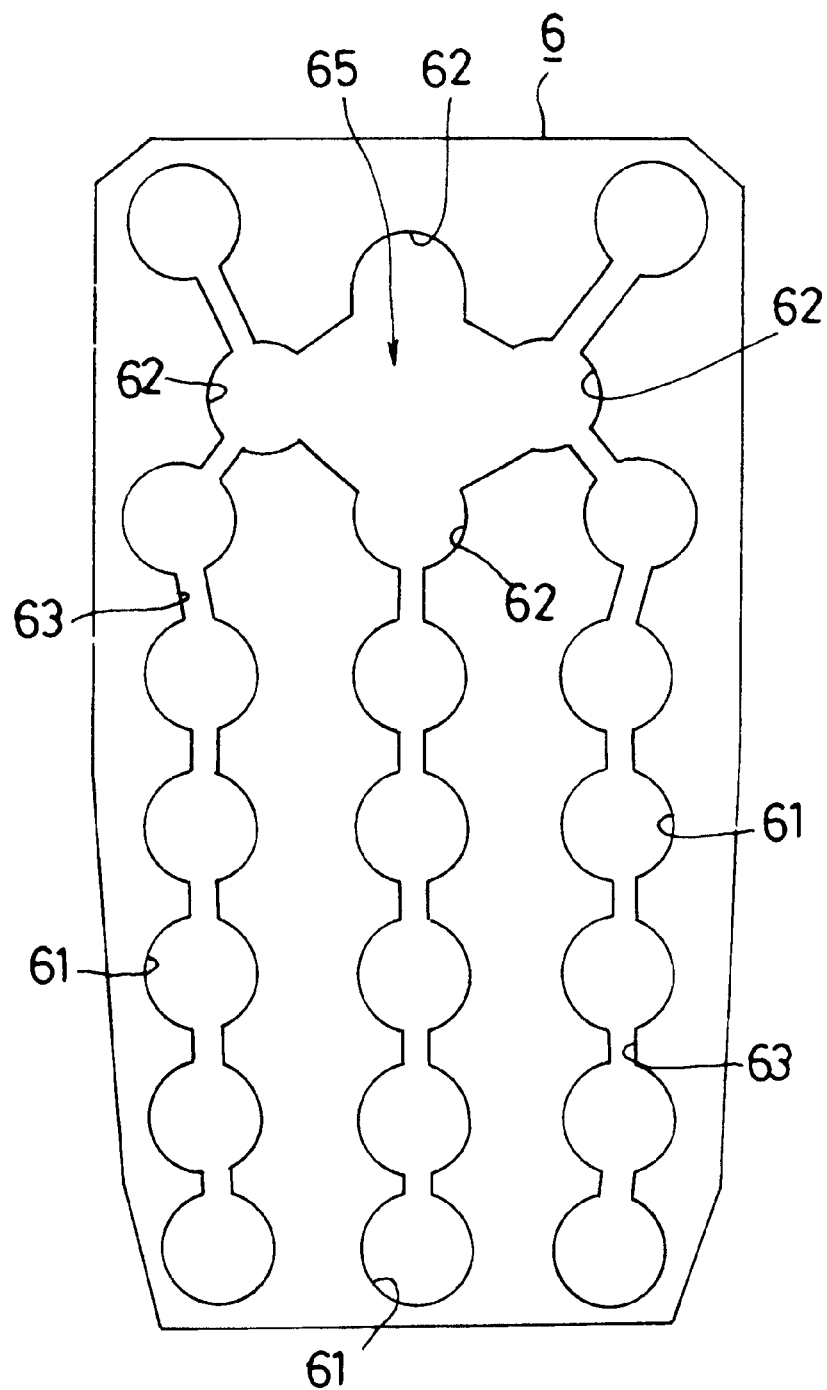
FIG. 6 is a plan view of a spacer sheet.

With reference to FIG. 6, the spacer sheet 6 is formed with a plurality of circular holes 61 corresponding to the respective dome portions 71 of the dome sheet 7, and slotlike air vents 63 interconnecting these circular holes 61. The shape of the circular hole 61 of the spacer sheet 6 is not limited to a geometric circles, but will be displaced by a polygon, for example, and can be selected when designed.

Figure 11:
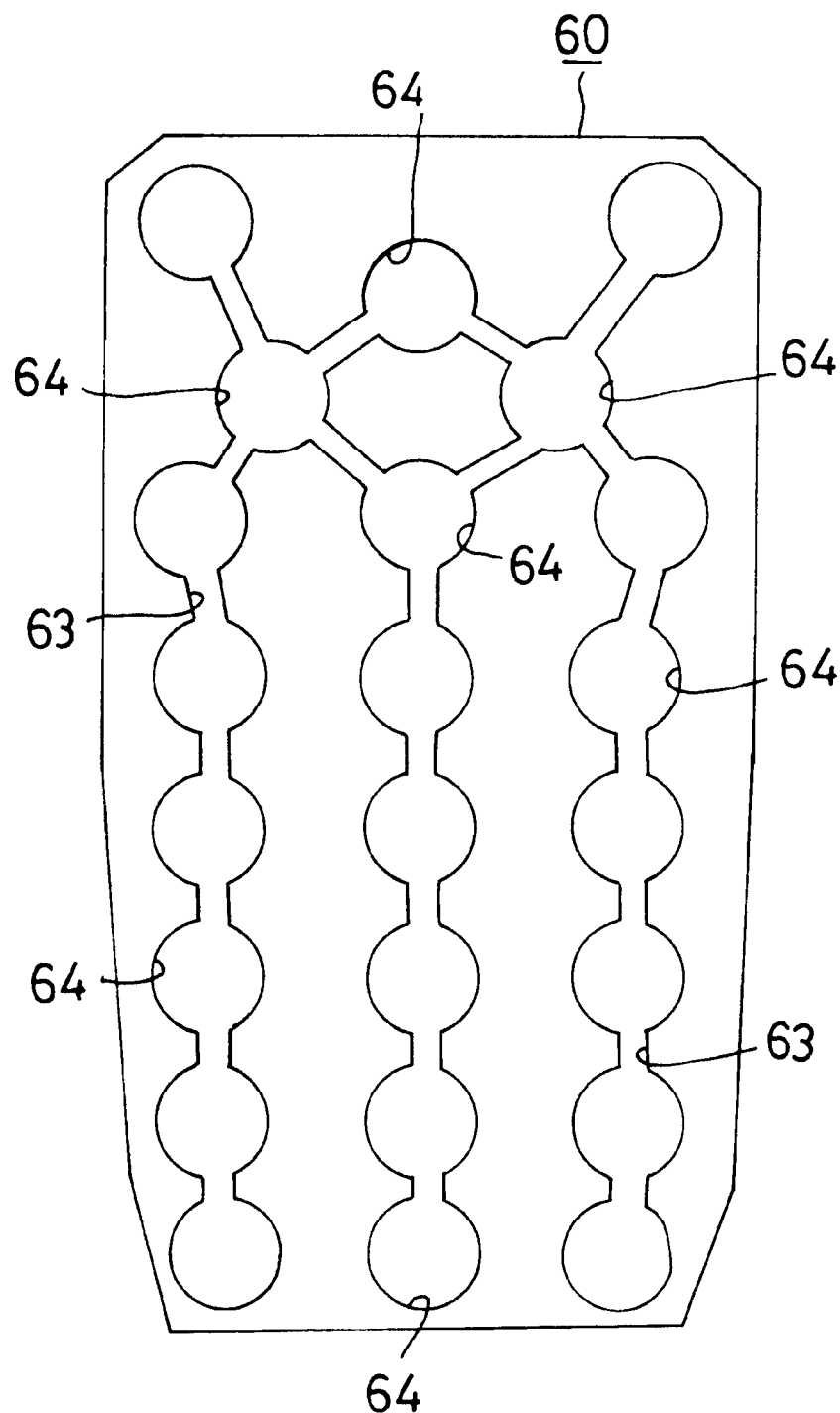
FIG. 11 is a plan view of a conventional spacer sheet.

The spacer sheet 6 further has a large opening 65 which is positioned inwardly of four circular holes 62 corresponding to the respective four dome portions 72 to be selectively depressed by the seesaw key 15 and which is formed by cutting out the region surrounded by these four circular holes 62. The opening 65 is shaped to have a contour including the four dome portions 72 of the dome sheet 7 and the inner region extending inwardly of these dome portions 72. On the other hand, the conventional spacer sheet 60 shown in FIG. 11 has four circular holes 64 corresponding to the four dome portions 75 of the dome sheet 7, whereas these circular holes 64 are merely interconnected by slotlike air vents 63, with no opening formed inwardly of the four circular holes 64.

Figure 7:
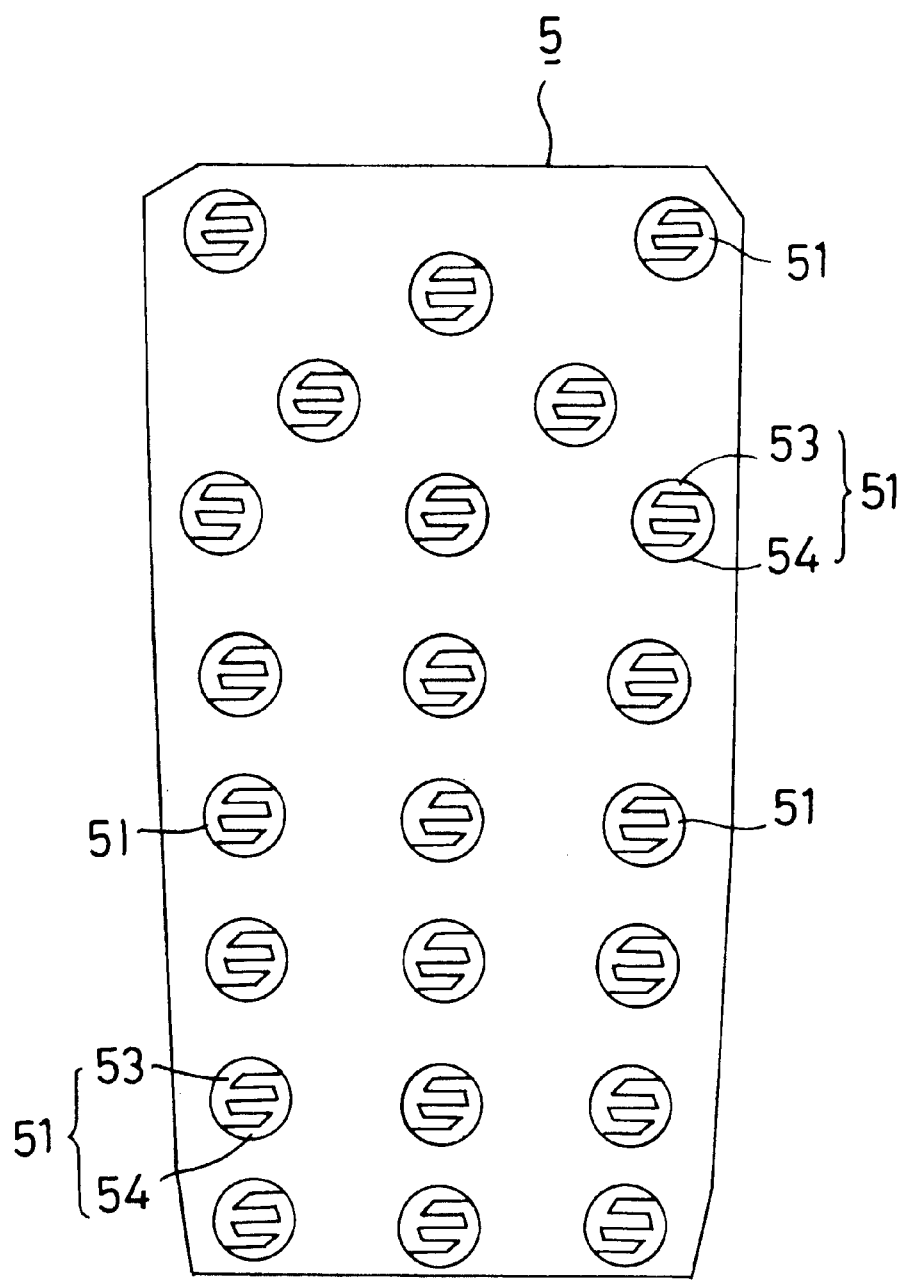
FIG. 7 is a plan view of a base plate.

With reference to FIG. 7, a contact electrode 51 comprising a pair of opposed comblike electrode pieces 53, 54 is formed on the surface of the base plate 5 in corresponding relation with each manual key 14. The contact of the contact terminal 52 on the inner surface of the dome portion 71 of the dome sheet 7 with the contact electrode 51 on the base plate 5 connects the pair of electrode pieces 53, 54 of the contact electrode 51 to each other to close the contacts.

Figure 2:
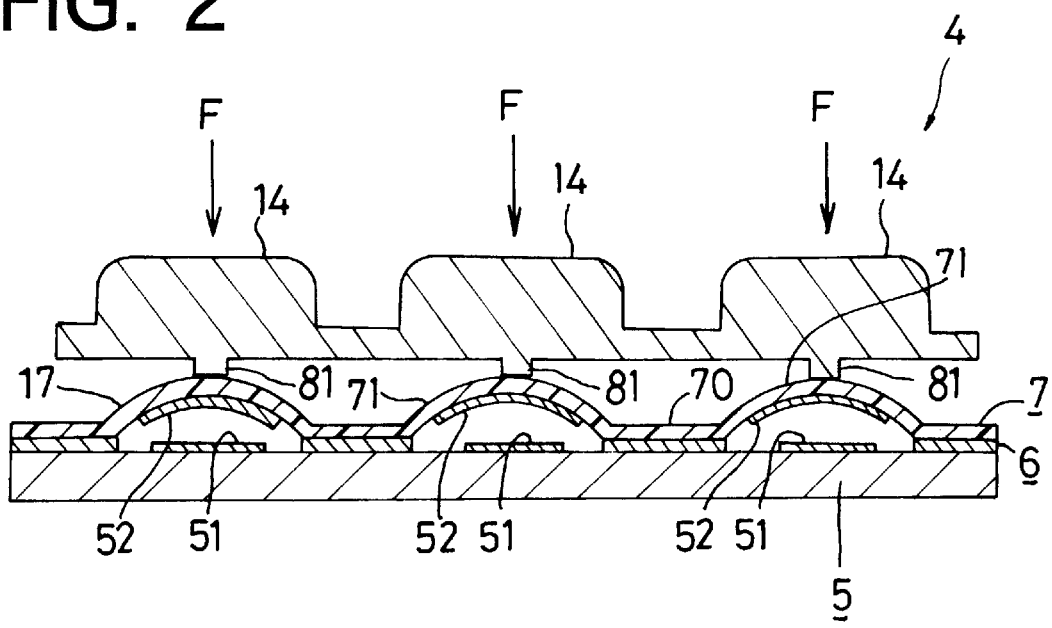
FIG. 2 is an enlarged view in section of the same device at the position of manual keys other than the seesaw key.

With respect to the dome portions 71 of the key sheet assembly 4 to be depressed by the respective manual keys 14 other than the seesaw key 15, the spacer sheet 6 of a definite thickness is interposed between the flat sheet portion 70 around each of these dome portions 71 and the base plate 5 as seen in FIG. 2, so that the dome portion 71 is positioned in parallel to the surface of the base plate 5. Accordingly, the depressing force F to be exerted on the manual key 14 acts on the dome portion 71 perpendicular thereto.

Consequently, the dome portion 71 of the dome sheet 7 is inverted symmetrically about the center axis of the dome portion 71 by being depressed by a pusher 81 of the key sheet 8, bringing the contact terminal 52 on the inner surface of the dome portion 71 into contact with the contact electrode 51 on the base plate 5 over a sufficient area to close the contacts. When the dome portion 71 of the manual key 14 is thereafter freed from the pressure, the dome portion 71 elastically restores itself to open the contacts.

With respect to the four dome portions 72 to be depressed by the seesaw key 15, on the other hand, the spacer sheet 6 is interposed between the outer region 73 of the flat sheet portion 70 of the dome sheet 7 and the base plate 5 as shown in FIG. 1, while the inner region 74 of the flat sheet portion 70 is joined to the surface of the base plate 5 through the opening 65 of the spacer sheet 6, with the result that the inner region 74 of the flat sheet portion 70 of the dome sheet 7 and the outer region 73 thereof are at different levels from the surface of the base plate 5, and the inner region 74 is positioned at a level which is lower than the level of the outer region 73 by an amount in match with the thickness (e.g., 0.1 to 0.2 mm) of the spacer sheet 6. For this reason, each of the four dome portions 72 to be selectively depressed by the seesaw key 15 is so inclined as to be positioned at a lower level toward the inner region 74 and at a higher level toward the outer region 73.

When one of these dome portions 72 is pushed by depressing the seesaw key 15, the seesaw key 15 moves in one direction about the contact portion of the end portion of the pivotal pin 15a and the flat sheet portion 70 of the dome sheet 7. Accordingly, the depressing force F of the seesaw key 15 is inclined with respect to a perpendicular extending through the base plate 5 perpendicular thereto, but the direction in which the depressing force F acts is accordingly positioned in the same or approximately the same direction as the center axis C extending through the dome portion 72 perpendicular thereto, as shown in FIG. 1, because the dome portion 72 is inclined as described above.

As a result, the dome portion 72 of the dome sheet 7 is inverted symmetrically about the center axis C by being depressed perpendicularly by a pusher 82 of the key sheet 8, bringing the contact terminal 52 on the inner surface of the dome portion 72 into contact with the corresponding contact electrode 51 on the base plate 5 over a sufficient area to close the contacts. Since the dome portion 72 deforms symmetrically about the center axis C at this time, this portion 72 enables the user to feel the same sharp click as when the other manual keys 14 are depressed. The dome portion 72 elastically restores itself to open the contacts when thereafter relieved of the pressure of the seesaw key 15.

With the portable telephone of the preferred embodiment of the present invention, the seesaw key 15, like the other keys, brings the contact terminal 52 on the inner surface of the dome portion 72 into contact with the corresponding contact electrode 51 on the base plate 5 over a sufficient area as described above, so that the pair of electrode pieces 53, 54 constituting the contact terminal 52 can be reliably connected to each other to close the key contacts.

The device of the present invention is not limited to the foregoing embodiment in construction but can be modified variously by one skilled in the art without departing from the spirit of the invention as set forth in the appended claims. Furthermore, the present invention is not limited only to portable telephones but can be applied to various electronic apparatus having a key input device.

What is claimed is:

1. A key input device comprising:
   a dome sheet provided over a base plate and having a plurality of upwardly bulging dome portions; and
   a plurality of manual keys disposed above the dome sheet for depressing the respective dome portions,
   the manual keys including a seesaw key adapted to selectively depress one of dome portions included among the dome portions, each of the dome portions being elastically restorably invertable by being depressed by the corresponding manual key to bring a contact terminal formed on an inner surface of the dome portion into contact with a contact electrode formed on a surface of the base plate and close contacts, the dome sheet having a flat sheet portion formed around the dome portions and comprising an inner region extending inwardly of the dome portions to be selectively depressed by the seesaw key, and an outer region extending outwardly of the dome portion, the seesaw key being formed with a pivotal pin extending toward the inner region of the dome sheet, a spacer sheet being interposed between the base plate and the dome sheet and being formed with a plurality of holes corresponding to the respective dome portions, the interposed spacer sheet providing a difference in level from the surface of the base plate between the inner region and the outer region so that the inner region is positioned at a lower level than the outer region, and the seesaw key pivotally moving about the contact portion of the pivotal pin and the inner region of the dome sheet to depress one of the dome portions.

2. A key input device according to claim 1, wherein the spacer sheet has an opening formed inwardly of holes corresponding to the respective dome portions to be selectively depressed by the seesaw key and including the holes, and the dome sheet has its flat sheet portion joined at the inner region to the surface of the base plate through the opening.

* * * * *